US005444469A

United States Patent [19]

Cowger

[11] Patent Number: 5,444,469

[45] Date of Patent: Aug. 22, 1995

[54] PRINTING METHOD AND APPARATUS FOR REGISTERING DOTS

[75] Inventor: Bruce Cowger, Corvallis, Oreg.

[73] Assignee: Hewlett Packard Corporation, Palo Alto, Calif.

[21] Appl. No.: 939,506

[22] Filed: Sep. 2, 1992

[51] Int. Cl.[6] .................. G01D 9/30

[52] U.S. Cl. .................. 347/14; 347/37

[58] Field of Search .................. 346/1.1; 347/14, 15, 347/37

[56] References Cited

U.S. PATENT DOCUMENTS 4,709,245 11/1987 Piatt .................. 346/140
4,709,248 11/1987 Piatt .................. 346/140
4,734,868 3/1988 DeLacy .................. 364/519
4,922,270 5/1990 Cobbs et al. .................. 346/140
5,289,208 2/1994 Haselby .................. 346/140

FOREIGN PATENT DOCUMENTS 59-15935 9/1984 Japan .................. 346/1.1
8201415 4/1982 WIPO .................. 346/75

*Primary Examiner*—Benjamin R. Fuller
*Assistant Examiner*—Valerie Ann Lund

[57] ABSTRACT

A method for registering printer dots in a printer having separate cartridges or print bars which create dots on paper moving therebeneath. Commands are generated to drive a paper carrier past the cartridges. Machine readable targets on the paper carrier are scanned and a processor uses signals generated by the targets for measuring the distance traveled by the carrier between detection of the first and second marks. The difference between the measured distance and the distance which yields ideal registration is used to delay (or advance) dot firing to improve registration. In another aspect, targets comprising slots oriented transverse to paper movement and at a 45° angle relative to paper movement are photolithographically engraved in nozzle plates. The slots are scanned to produce information about misregistration along an axis in the direction of paper movement and along an axis transverse thereto.

12 Claims, 11 Drawing Sheets

PRINTING METHOD AND APPARATUS FOR REGISTERING DOTS

BACKGROUND OF THE INVENTION

1. Field of the Invention

The present invention relates to printing methods and apparatus for registering printed dots and more particularly to such methods and apparatus in which misregistration between dot generating elements is measured and used to shift the position of the printed dots to improve registration.

2. Description of the Related Art

Raster or matrix type printers are capable of printing a plurality of rows of dots on print media, such as paper, as a print cartridge moves relative to the paper. The print cartridge in some such printers comprises a print bar, or in the case of color printers a plurality of print bars, which are as wide as the paper. The only movement is that of the paper relative to the print bar as dots are printed on the paper. In the case of a swath printer, a print carriage containing print cartridges moves laterally above a sheet of paper during a first printing scan while the paper remains stationary. The paper then advances and the print carriage moves across the paper again while the paper remains stationary in its new position.

A color printer includes a plurality of cartridges for printing different colored dots on the same portion of a sheet of paper. If the dots are not correctly registered relative to one another the printed information contains a fuzzy or halo quality which is undesirable.

Prior art techniques exist for registering dots printed by separate cartridges on a single printer. For example, in U.S. Pat. No. 5,289,208 issued Feb. 22, 1994 by Haselby and assigned to the assignee of the present application, an optical sensor detects misalignment of horizontal and vertical lines printed by separate ink-jet cartridges mounted on a print carriage. The Haselby device uses techniques and circuitry to change the timing of nozzle firing and to select different cartridge nozzles for printing dots so as to properly register dots printed by nozzles on different printhead cartridges. In addition, the angular position of one of the cartridges is adjusted relative to one another by adjusting a cam which tilts the cartridge.

U.S. Pat. No. 4,922,270 to Cobbs et al. discloses an inter pen offset determination and compensation in multi-pen thermal ink jet printing systems and is assigned to the assignee of the present application. The Cobbs et al. system uses an aperture plate disposed in the print media plane which prevents an ink drop ejected from a nozzle over the plate from striking the print media. An optical drop detector determines when drops are intercepted by the aperture plate thereby generating nozzle position data. This data is used to adjust timing of drop firing to correct for misalignment between nozzles on different cartridges.

U.S. Pat. No. 4,709,244 to Piatt et al. includes an optical scanner which sense leading and trailing edges of an ink cartridge nozzle plate thereby generating position data, along the axis of cartridge movement, indicative of the relative positions of nozzles in different cartridges. The data is used to adjust drop firing times to improve printed dot registration. Both the Piatt et al. and Cobbs et at. systems incorporate carriage position sensors for determining the position of a carriage upon which the print cartridges are mounted.

SUMMARY OF THE INVENTION

In one aspect, the present invention comprises a method and apparatus for registering printer dots in which a print media carder is moved past the dot-generating elements. The distance for the print media to travel from a first position to a second position is approximated. The second position is one at which dots printed on the print media by a first dot-generating element when the print media is in the first position are registered with dots printed by a second dot-generating element when the print media is in the second position. The actual distance between the first and second positions is measured. The difference between the approximated and measured distance is calculated and is used to shift the position of dots printed on the print media by one of the dot-generating elements in a direction which improves dot registration.

In another aspect of the invention, means are provided for scanning first and second dot-generating elements in a printer. The scanning means generates signals indicative of the relative positions of the dot-generators on the first and second elements along a first axis parallel to the direction of print media movement and along a second axis transverse thereto.

The present invention provides nozzle position data along both a media scan axis and an axis transverse thereto responsive to an optical scan of the print cartridge. In another aspect of the present invention, misregistration caused not only by cartridge misalignment but also by speed variations in the print media carder is corrected.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENTS

Figure 1:
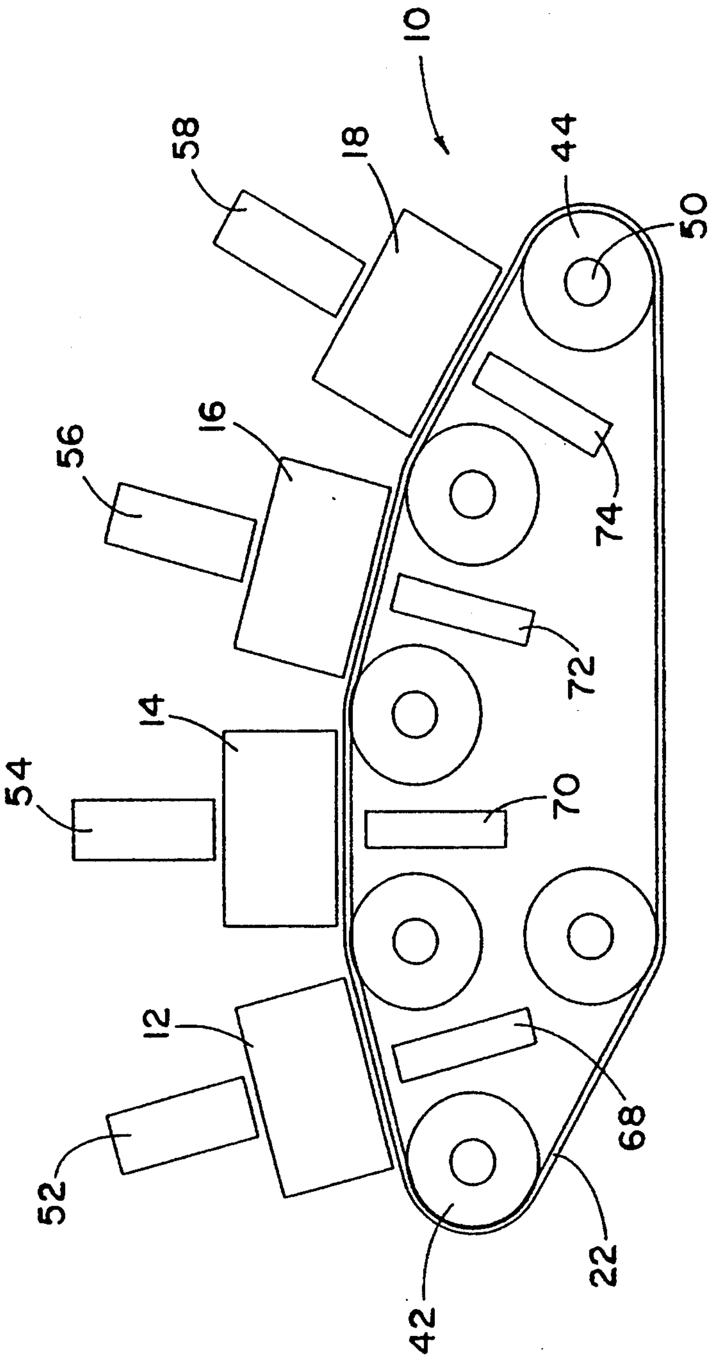
FIG. 1 is a side elevation view, in schematic form, of a portion of a printer constructed in accordance with the present invention.
Figure 2:
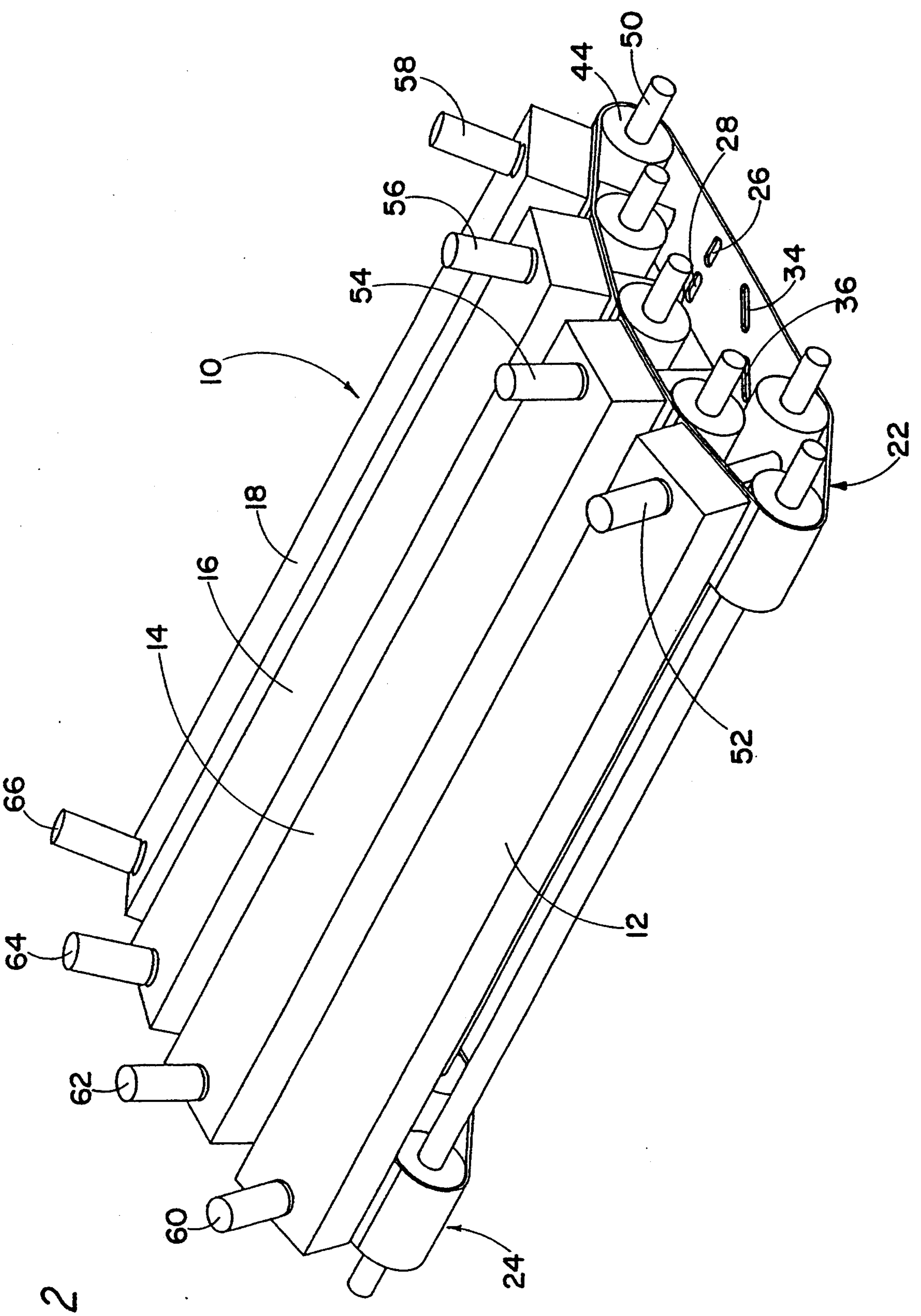
FIG. 2 is a perspective view of the printer of FIG. 1.
Figure 3:
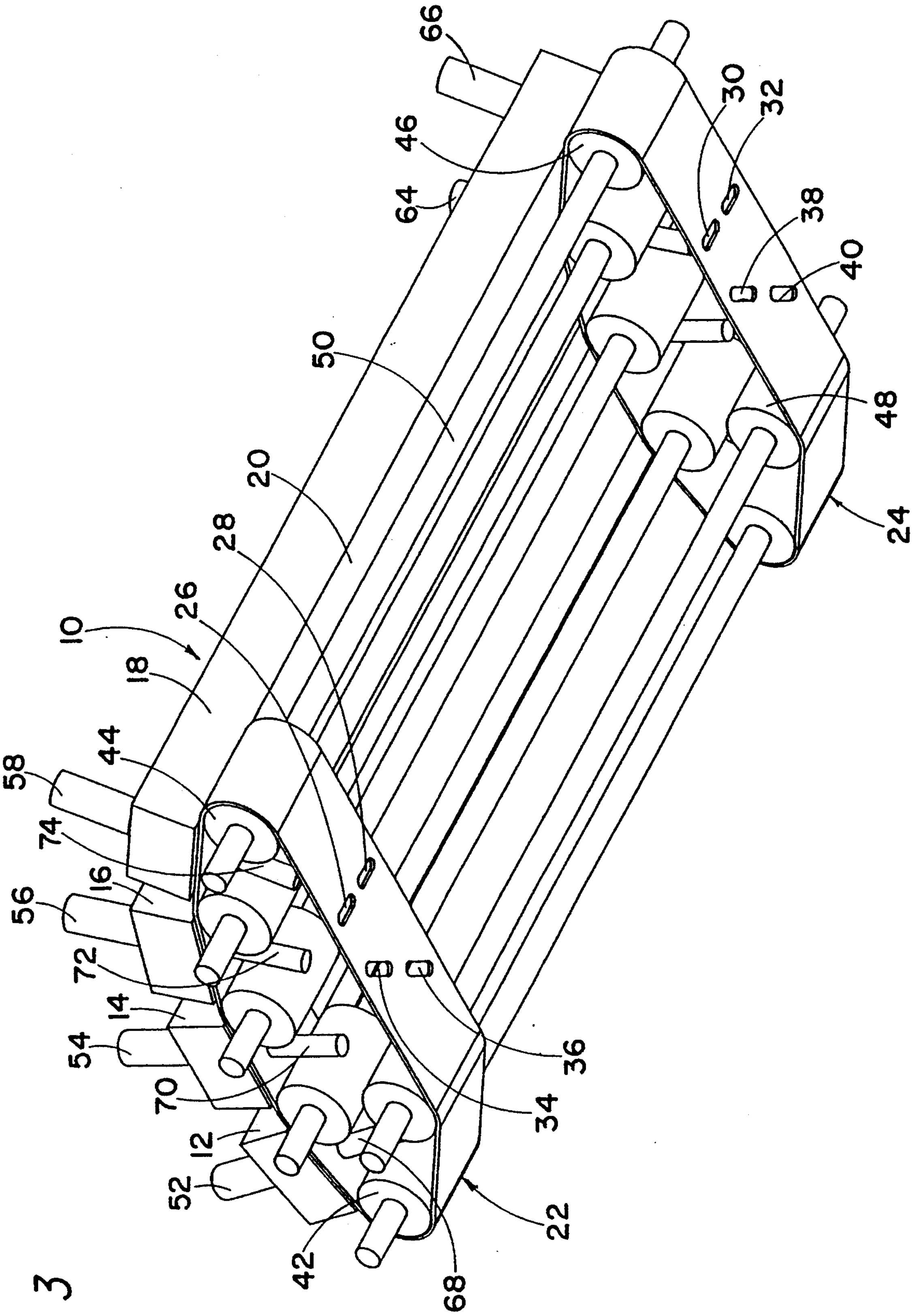
FIG. 3 is another perspective view of the printer.

Turning first to FIGS. 1–3, indicated generally at 10 is a portion of a first printer constructed in accordance with the present invention. Printer 10 includes a black print bar 12 a cyan print bar 14 a yellow print bar 16 and a magenta print bar 18. Print bars 12, 14, 16, 18 are referred to herein as dot-generating elements. Each of the print bars includes a downwardly-directed surface which includes a plurality of nozzles, each of which are referred to herein as dot-generators, for firing discrete drops of ink on print media such as paper as it moves beneath the print bars. For example, in FIG. 3, print bar 18 has a surface 20, commonly referred to as a nozzle plate, in which discrete nozzles (not shown) are formed.

Printer 10 includes paper drive belts 22, 24. Belts 22, 24 are substantially identical to one another. Each is an endless belt including a pair of transverse slots, slots 26, 28 on belt 22, and slots 30, 32 on belt 24. Each belt also includes a pair of angled slots, slots 34, 36 on belt 22 and slots 38, 40 on belt 24. Belts 22, 24 are referred to herein as a print media carrier or paper carder. Slots 26-40 are referred to herein as machine readable marks.

Each belt is received over a plurality of belt drive wheels, like wheels 42, 44, 46, 48. Each of the wheels is mounted on a shaft, like wheels 44, 46 are mounted on shaft 50. One of the shafts is driven in a known manner to move belts 22, 24 so that paper is carried on top of the rotating belts, as viewed in FIG. 1, and beneath each of print bars 12, 14, 16, 18. The belts are positively engaged with the drive wheels by way of a grooved timing belt which meshes with corresponding grooves on the drive wheels. The use of such wheels and belts for transporting paper in an ink-jet printer is known and such a system can be built and used by a person having ordinary skill in the art.

Printer 10 further includes a plurality of light emitting diodes (LEDs) 52, 54, 56, 58 at one end of print bars 12, 14, 16, 18, respectively. LEDs 60, 62, 64, 66 are mounted on the opposite ends of the print bars as shown. Each of the LEDs emits light downwardly, i.e., toward the print bar upon which it is mounted. An opening is foraged in the upper surface of the print bar which permits light from each LED to shine on the back of the photolithographically formed nozzle plate which forms a lower surface, like surface 20 (in FIG. 3) on print bar 18, of the print bar. Each nozzle plate has an opening (not shown) formed beneath each LED to permit light to pass through the opening in the nozzle plate and thus shine on the upper surface of the paper drive belt, e.g., light from LED 58 shines on paper drive belt 52. Each opening in the nozzle plate is photolithographically formed when the nozzles therein are formed and thus is well registered to the nozzles, i.e., the relative positions of the nozzles and the openings in each plate is known with a high degree of precision.

With reference to FIG. 1, a plurality of photo detectors 68, 70, 72, 74 are mounted on frame structure (not shown) of printer 10 so that in the absence of belt 22, light shine from the LED above each print bar strikes and is detected by an associated detector beneath the nozzle plate opening. As can be seen in FIG. 3, each of lights 60-66 includes an associated photo detector similarly positioned beneath the opening in an associated nozzle plate through which light passes.

Each associated LED and photo detector, like LED 52 and photo detector 68, is referred to herein as a detector or means for sensing a mark.

Figure 4:
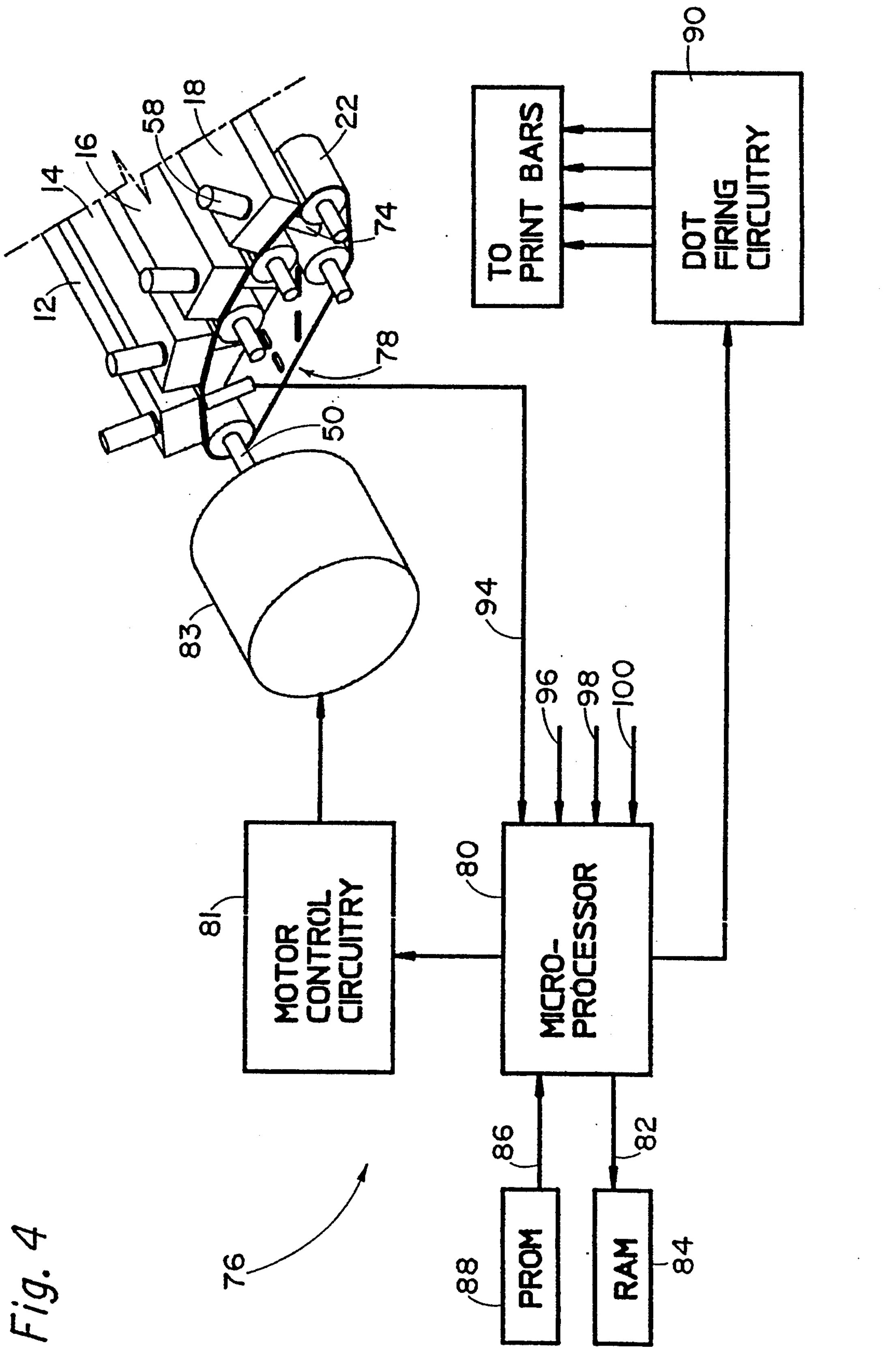
FIG. 4 is a schematic diagram of a portion of the circuitry which controls the printer of FIGS. 1–3.

Turning now to FIG. 4, indicated generally at 76 is a schematic diagram of a portion of printer 10. The structure previously identified in FIGS. 1–3 retains the same numeral in FIG. 4. Slots 26, 28, 34, 36 are indicated generally at 78.

A microprocessor 80 is connected in the usual manner via bus 82 to random access memory (RAM) 84. Similarly, processor 80 is connected via bus 86 to a programmable read only memory (PROM) 88. PROM 88 includes a coded algorithm, to be described hereinafter, which operates on data provided to processor 80. PROM 88 also includes a conventional coded algorithm for timing the firing of drops of ink from a conventional printhead. Timing signals generated by the algorithm are provided by microprocessor 80 to conventional dot firing circuitry 90 which in turn controls application of voltage pulses to print bars 12, 14, 16, 18 thereby ejecting ink from the print bars onto paper in the printer.

Microprocessor 80 also provides control signals, in known manner, to conventional motor control circuitry 81. PROM 88 includes conventional coding for generating such signals. The control circuitry provides drive signals to a motor 83 which in turn rotates shaft 50 thereby driving paper drive belts 22, 24. Motor 83 is a servomotor which utilizes a known system (not shown) for detecting and counting fine lines on a stationary portion of the printer interior for driving the belts, and therefore paper supported thereon, to selected positions for printing.

Signals from each of the photo detectors, like photo detector 74, shown in FIGS. 1–3 are applied via conductors, like conductors 94, 96, 98, 100 to inputs of microprocessor 80. All of the photo detectors and conductors are not illustrated in FIG. 4 to simplify the diagram. Other aspects of printer 10, such as how image data is provided to microprocessor 80, are not shown or described herein but will be readily apparent to a person having ordinary skill in the art to which the present invention relates.

In operation, the user actuates a printer control (not shown) which causes processor 80 to drive motor 83 via circuitry 81 thereby rotating paper drive belts 22, 24. As used herein, the terms first axis or Y-axis refer to an axis oriented parallel to the direction of paper movement through the printer. The terms second axis or X-axis refer to an axis transverse thereto, i.e., parallel to the longitudinal axis of each of print bars 12–18. Code in PROM 88 programs processor 80 to drive the motor at a preselected rate. The signals supplied to processor 80 via conductors, like conductors 94–100, from photo detectors, like photo detectors 74, provide data to the microprocessor indicating the position of each paper drive belt relative to each print bar as follows. First, with reference to FIG. 2, each time slot 26 passes beneath LEDs 52–58, a signal is supplied to processor 80. As will be recalled, each LED produces light which passes through a photolithographically formed aperture in its associated nozzle plate. The signals on the conductors therefore provide the microprocessor with information indicative of the relative transverse position of the print bars. Transverse position refers to the distance between the print bars in the direction of paper movement measured at LEDs 52–58 or LEDs 60–66. Ideally, if the print bars are perfectly registered, and belts 22, 24 drive at the exact speed set by processor 80, the expected distance between detection of slot 26 by the LEDs will be equal to the actual distance as measured by the signals generated by the LEDs. The expected distance, assuming ideal positioning of each print bar, is stored in prom 88 and is determined in a conventional manner using the system for driving servomotor 83. Often, however, because of mechanical misalignment of each of print bars 12–18 (or because of periodic variations in speed injected by the wheels, like wheel 44, and associated mechanical structure which drive belts 22, 24), the actual distance deviates from the expected distance. The expected distance can therefore be considered an approximation.

This difference, which may be either a positive or negative distance, is computed by processor 80 and stored in registers contained in circuitry 90. The dot firing algorithm in PROM 88 uses the difference to further delay or advance dot firing of each of printheads 12–18 thereby registering the dots on the paper with one another. Dots printed by print bar 18 when paper (not shown) on belts 22, 24 is in a first position are thus registered with dots printed by print bar 16 when the paper has moved to a second position. Because the difference is calculated by the sensors incorporating LEDs 60–66 at one end of each print bar and by the sensors incorporating LEDs 52–58 at the other end of each print bar, the difference can be extrapolated along the length of the print bar thereby providing a different delay, or advance, for each nozzle along the longitudinal axis of the bar in order to accurately register the dots. Such extrapolation corrects print bar skew, i.e., mechanical misregistration in both the X and Y axes. An additional set of sensors positioned in the middle of the bar can be used to determine first order warping (bending) of the print bar in conjunction with data generated by each of the other sensors. Additional sets of sensors located along each print bar can be used to correct for higher order bending of the print bar.

After Y-axis delay (or advance) is determined, angle slot 34 passes beneath each of LEDs 52–58. Because it is at an approximately 45° angle relative to the X and Y-axes, X-axis misregistration, i.e., shifting of each print bar along its longitudinal axis, can be derived from the relative timing of each of the signals generated when slot 34 passes beneath LEDs 52–58 and from the calculated Y-axis misregistration. Because the slot is at an angle, if the print bar is shifted one way or the other from its ideal fully registered location, the time between signals generated by interaction of slot 34 with each of the LEDs varies from an expected value.

The value by which each print bar is laterally displaced is also stored in registers in circuitry 90. These values are used by the dot firing circuitry to shift image data laterally (along the X axis) from one firing nozzle to another in order to compensate for the offset. Alternately, or in addition, the lateral offset data generated by the angled slots could be used to control a piezomotor for physically shifting each bar along its longitudinal axis by an amount to compensate for the longitudinal offset.

The foregoing system therefore provides information about the relative position of the print bars without the need for an absolute position transducer on the paper carrier. It should be appreciated that rather than using slots in each print belt, a piece of paper having appropriate markings thereon could be scanned as it proceeds along the normal paper transport route in the printer.

Figure 5:
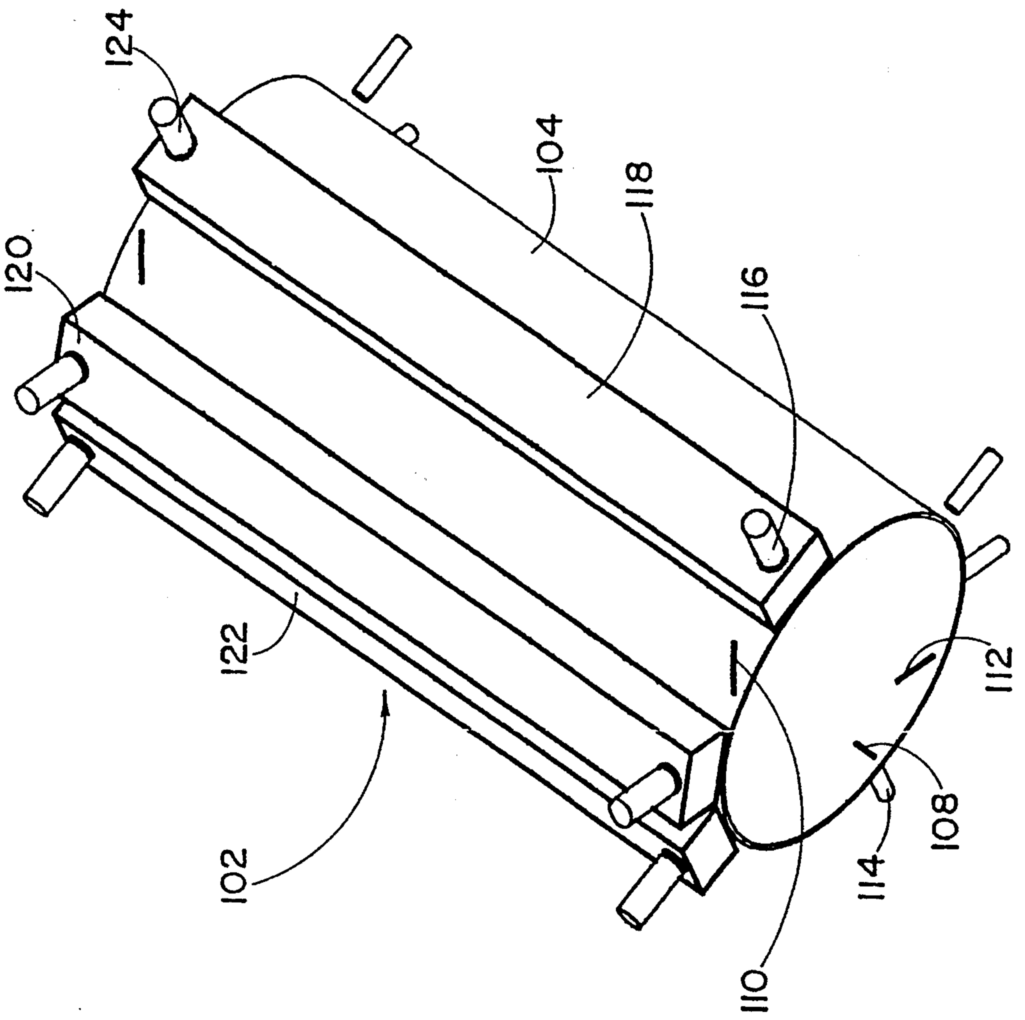
FIG. 5 is a perspective view, in schematic form, of a portion of a second embodiment of a printer constructed in accordance with the present invention.
Figure 7:
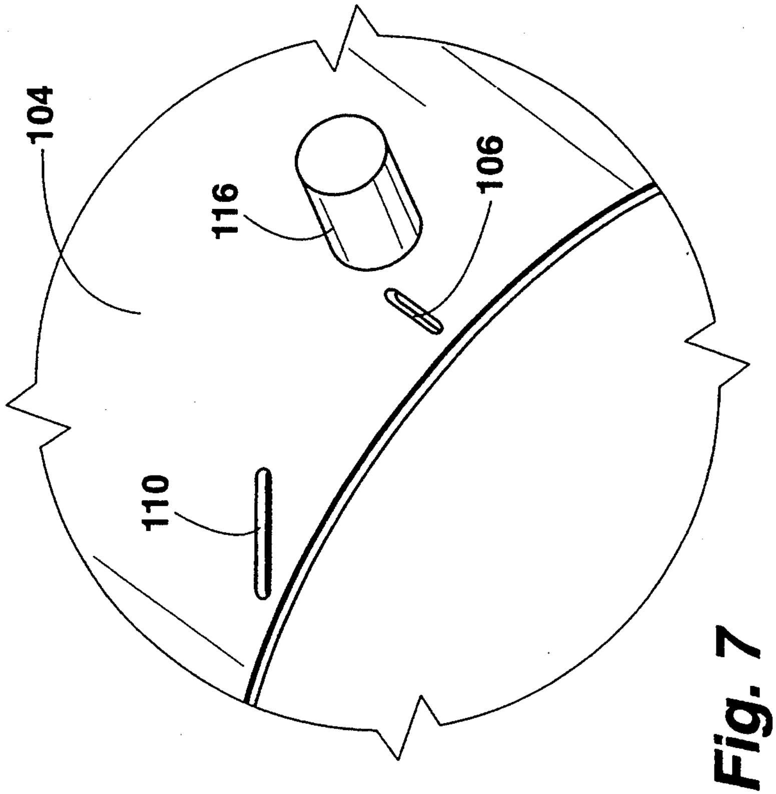
FIG. 7 is an enlarged view of a portion of FIG. 6.
Figure 6:
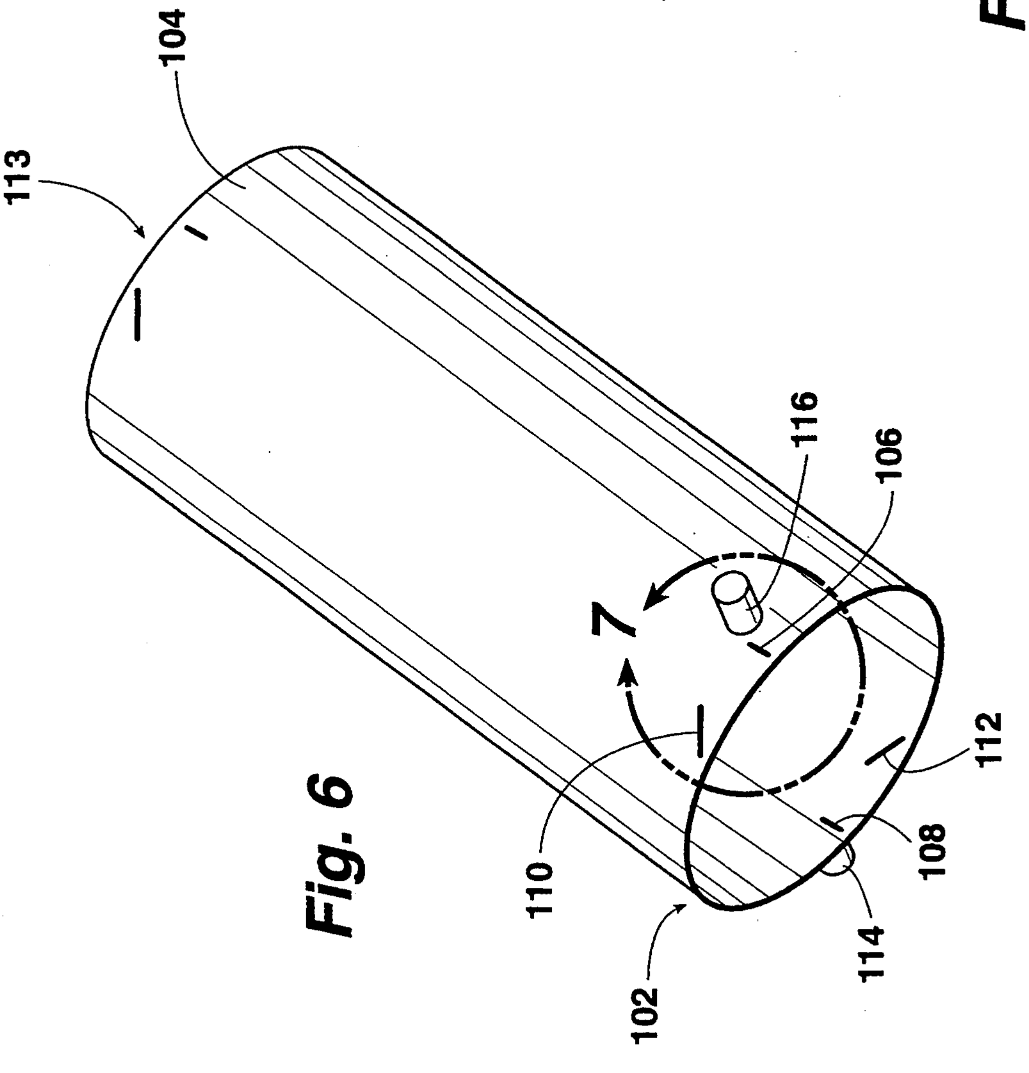
FIG. 6 is a view similar to FIG. 5 with portions of the structure omitted to reveal additional features.
Figure 8:
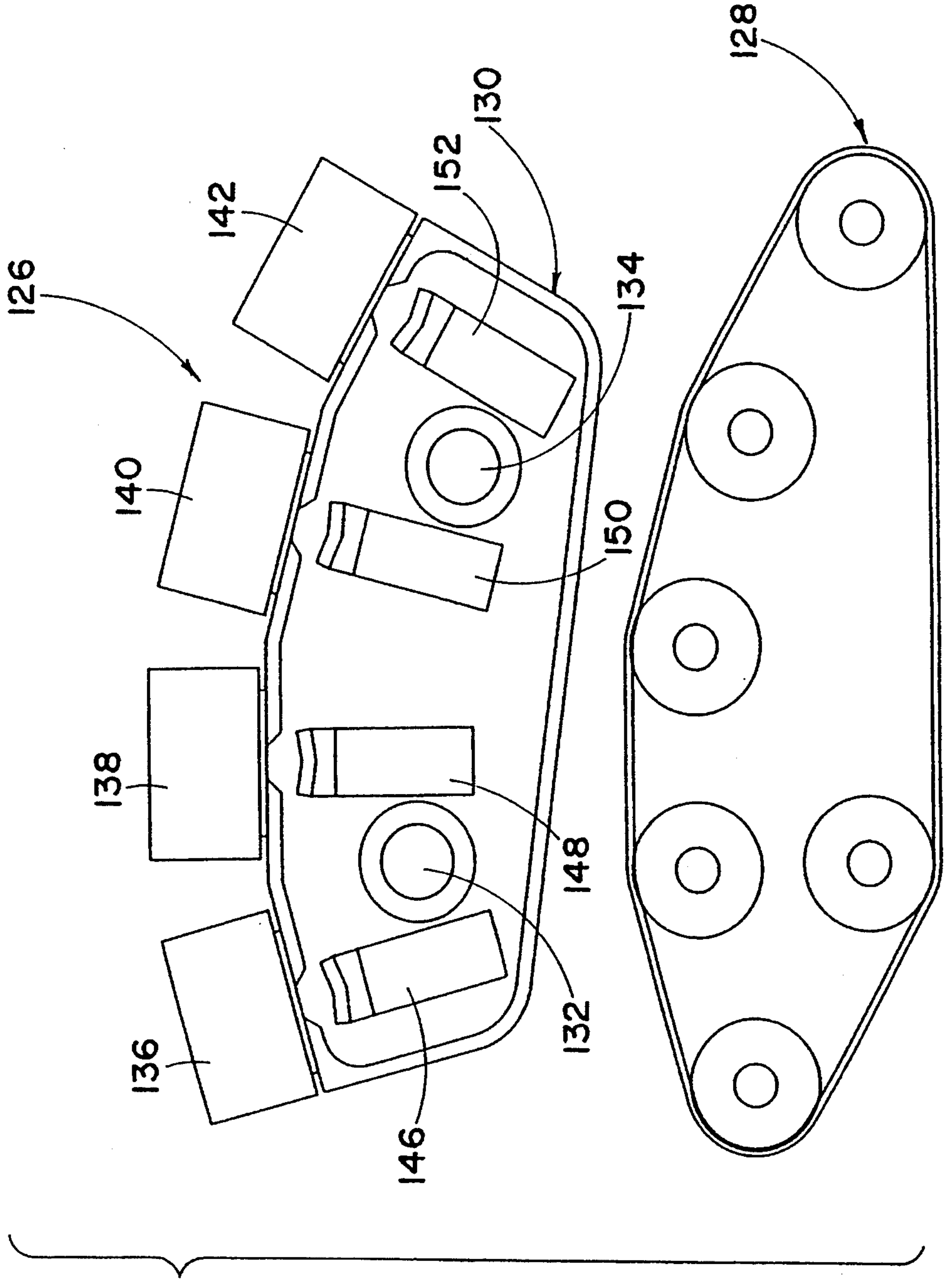
FIG. 8 is a side elevation view of a portion of a third printer constructed in accordance with the present invention.
Figure 9:
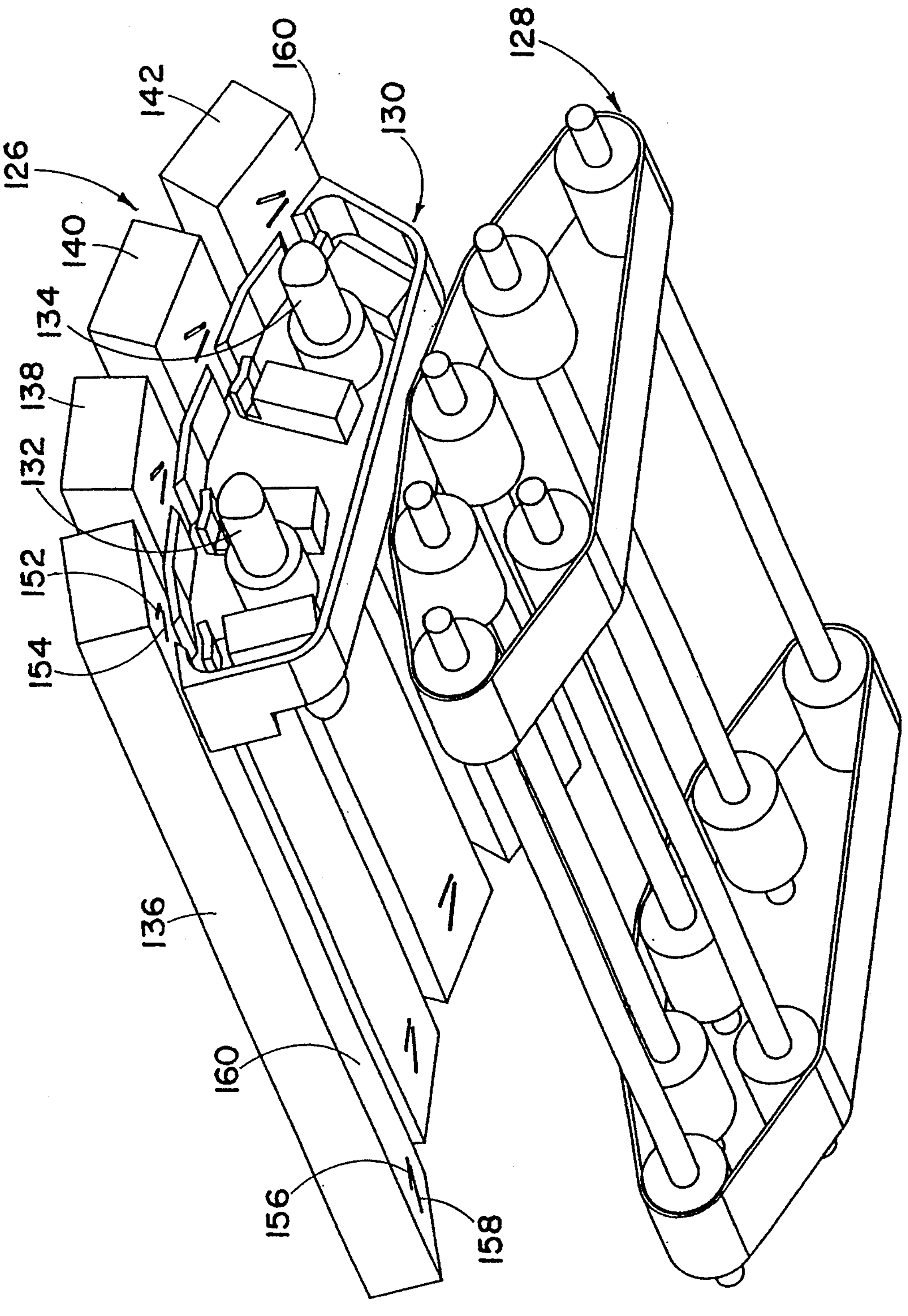
FIG. 9 is a perspective view of the printer of FIG. 8.

Turning now to FIGS. 5–7 indicated generally at 102 is a portion of another printer constructed in accordance with the present invention. Printer 102 is of the type having a cylindrical drum 104 around which paper (not shown) wraps during printing. Drum 104 includes therein transverse slots 106, 108 and angled slots 110, 112. A LED 114 is positioned on one side of drum 104. Diametrically opposed therefrom, on the other side of the drum is a photo detector 116. LED 114 and photo detector 116 are oriented toward one another so that when nothing obstructs a light beam from the LED, it strikes detector 116.

In FIG. 5 print bars 118, 120, 122 are mounted on a printer frame (not shown) so that photolithographically foraged nozzles are oriented toward the drum for firing ink drops on paper wrapped around the drum as the drum rotates. Each of the print bars has an associated detector, like detector 116, mounted thereon. A diametrically opposed LED, like LED 114, is mounted on the opposite side of drum 104. Like the embodiment of FIGS. 1–3 each of the print bar nozzle plates (not shown) includes a photolithographically formed opening through which light from the LED associated therewith passes when there is no obstruction between the LED and the photo detector. Each of the print bars includes a photo detector on either end thereof with photo detector 124 being mounted on print bar 118 opposite photo detector 116.

The bulk of the structure depicted in the schematic diagram of FIG. 4 is also incorporated into printer 102 except that motor 83 drives an axle (not shown) upon which drum 104 is mounted to effect drum rotation. As in FIG. 4, printer 102 feeds back a signal generated by a conventional servomotor system (not shown) to the printer microprocessor. In printer 102, the motor which rotates drum 104 rotates an integral number of times for each single rotation of the drum. Also, a timing belt links the motor shaft with the drum axle so that any speed variations which result from mechanical anomalies are periodic, i.e., occur at the same angular position and in the same manner during each rotation of drum 104.

Operation of printer 102 is similar to that described in connection with the printer in FIGS. 1–4. If any of the print bars are misaligned along the Y-axis, i.e., the direction of paper movement beneath each print bar, light shining through slots 106, 108 strikes LED 116 either sooner or later than expected by microprocessor 80. This produces a delay (or advance) time stored in RAM 84 which is used by a conventional dot firing algorithm to delay or advance dot ruing in order to register dots printed by each of the print bars with one another. Doing so nulls out speed variations of the drum which are periodic with its revolution such as those resulting from an irregular drive belt or roller. This results from the fact that errors introduced while measuring relative positions of the print bar are repeated when ink droplets are fired from each nozzle in the print bars. Having two slots, like slots 106, 108 and like slots 110, 112, diametrically opposed on the drum provides a great deal of accuracy.

It should be appreciated that in either of the embodiments described thus far, larger windows, rather than slots, may be used with the photo detector sensing a rise (or fall) in signal as a LED light beam crosses a window edge. As in the embodiment of FIGS. 1–3, angled slots 110, 112 can be used to detect misalignment of print bars along the longitudinal axes thereof. Slots, indicated generally at 113, operate in the same fashion as slots 106, 110, and include diametrically opposed slots (not visible) and associated LEDs (not shown) and photo detectors (also not shown).

Turning now to FIGS. 8–12, indicated generally at 126 is a portion of another embodiment of the printer constructed in accordance with the present invention. Included therein is a paper drive assembly indicated generally at 128 which is substantially identical to the corresponding structure in the printer of FIGS. 1–3 except that the drive belts do not include slots.

Also included therein is a traverser assembly 130 which is mounted on a pair of rods 132, 134 (only a portion of which are shown) for movement beneath and parallel to the longitudinal axes of print bars 136, 138, 140, 142. The drive assembly is shown in a lower position; it is also positionable in an upper position directly beneath the print bars as in the embodiment of FIGS. 1–3 when the traverser assembly is at one end of its range of travel. A conventional motor (not shown) drives traverser assembly 130. The traverser assembly includes a conventional position transducer for tracking the position of assembly 130 relative to either end of its range of travel. Such information is provided to a printer microprocessor (not shown) which performs similar functions to microprocessor 80 in FIG. 4 as will be hereinafter described.

Retro-reflective optical detectors 146, 148, 150, 152 are mounted on traverser assembly 130. Each detector is conventional and includes a LED (not visible) directed upwardly at an angle and an associated photo detector (not visible) having a detecting surface directed generally upwardly adjacent the LED. Thus, when a downwardly-directed reflecting surface is positioned over one of the detectors, light from the LED reflects from the surface and into the detector thereby creating a signal which is supplied to a microprocessor in printer 136 (not shown) associated with circuitry like that shown in FIG. 4. Target elements, like target elements 152, 154 and target elements 156, 158 on print bar 142 (in FIG. 9) are photolithographically formed on a nozzle plate 160 along with the nozzles (not shown) on the plate. The targets provide a light to dark signal contrast for detection by the photo detectors as light from the LED moves from the orifice plate, across the target edge and into the target. Thus, as traverser assembly 130 moves along the underside of the print bars, signals are developed each time one of the detectors passes beneath a target element on its associated print bar.

Figure 10:
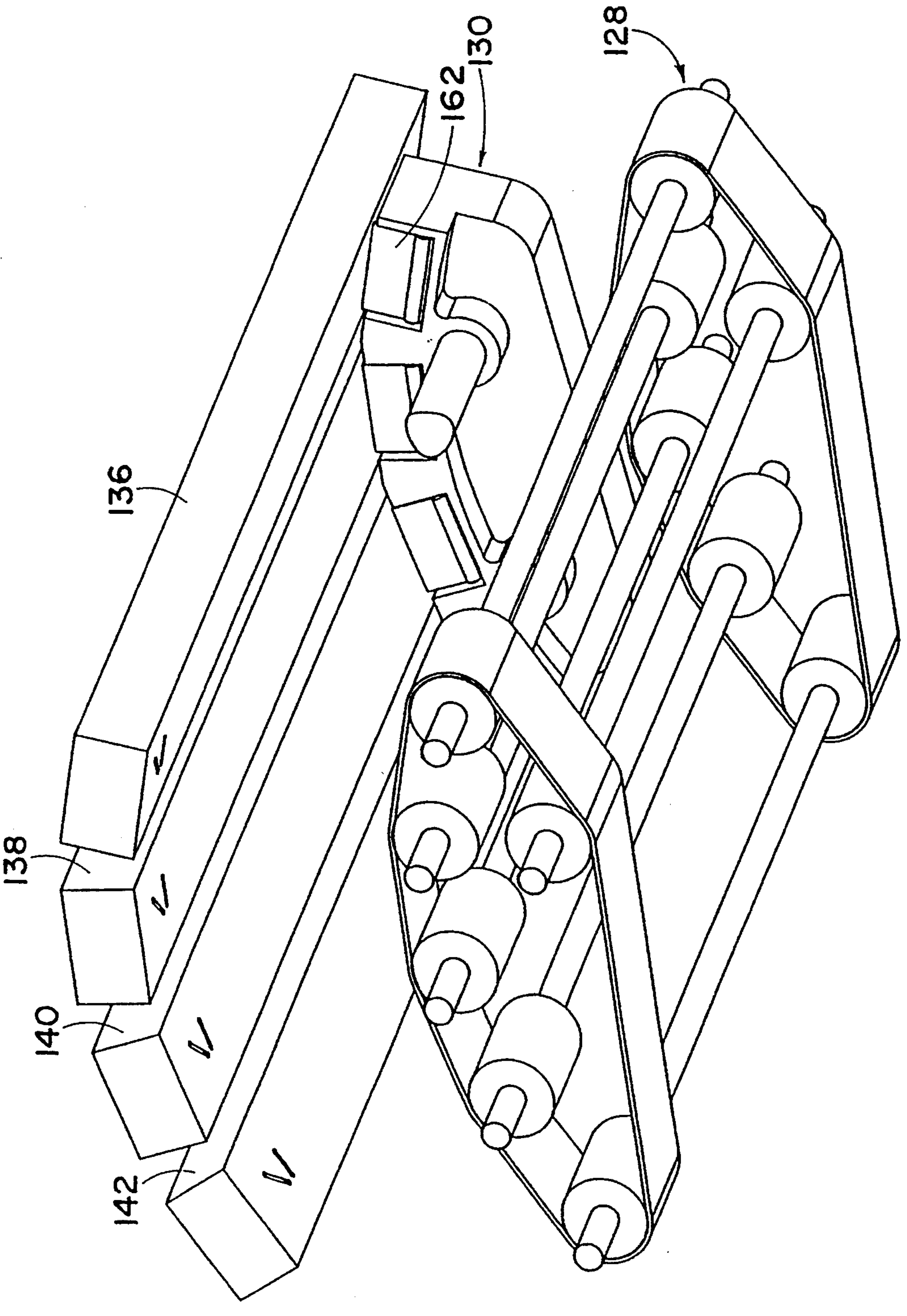
FIG. 10 is another perspective view of the printer of FIG. 8.
Figure 12:
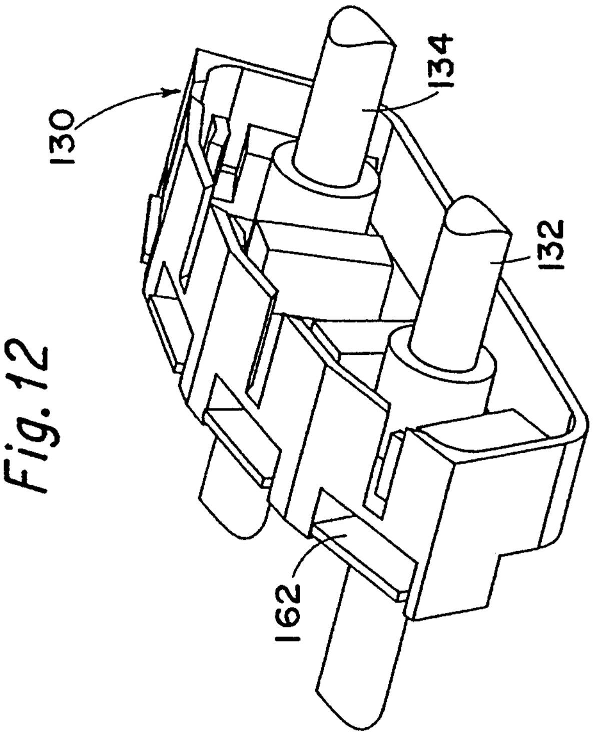
FIG. 12 is a perspective view of the traverser shown in FIG. 11.
Figure 11:
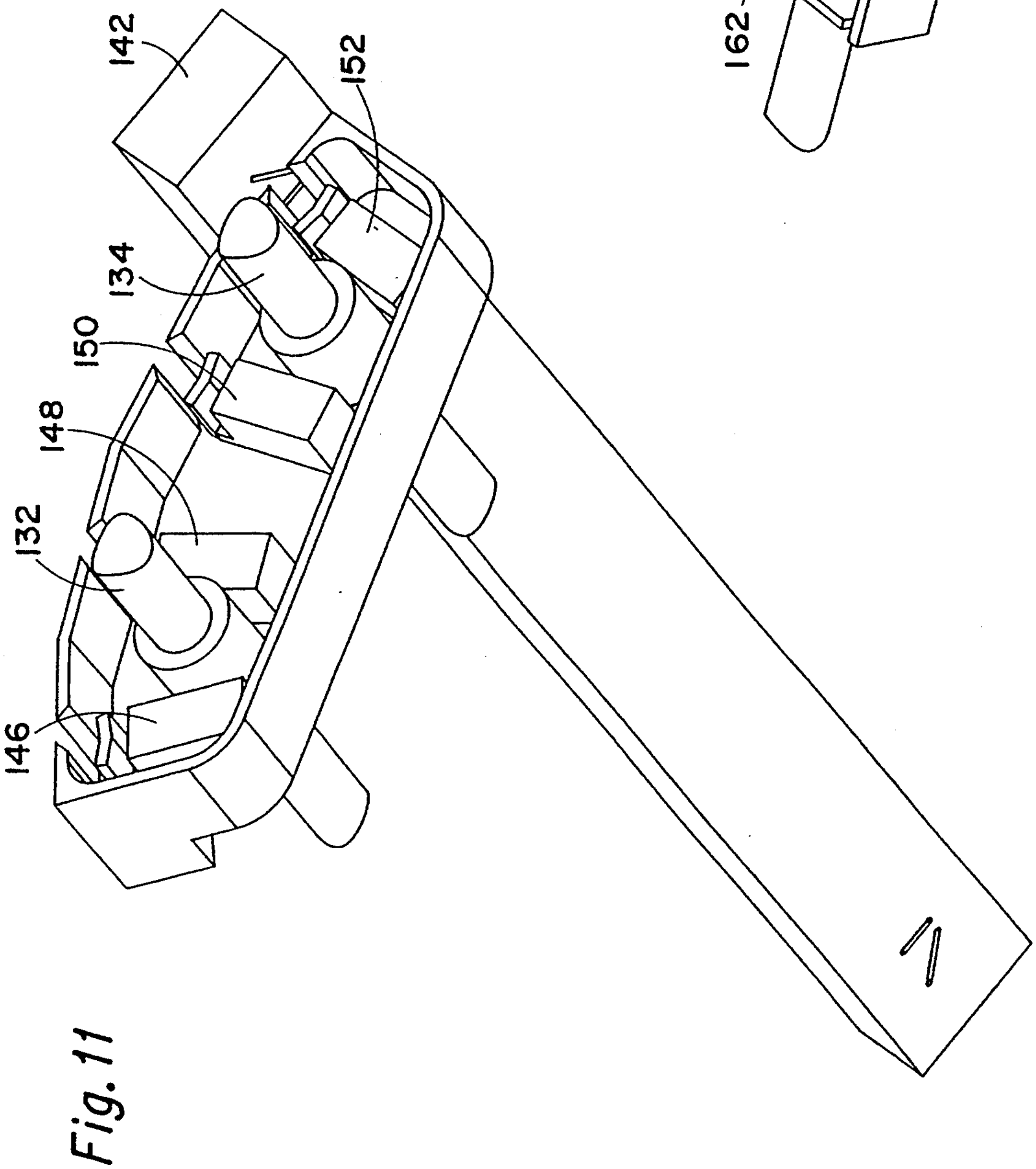
FIG. 11 is a partial perspective view of the printer of FIG. 8.
Figure 13:
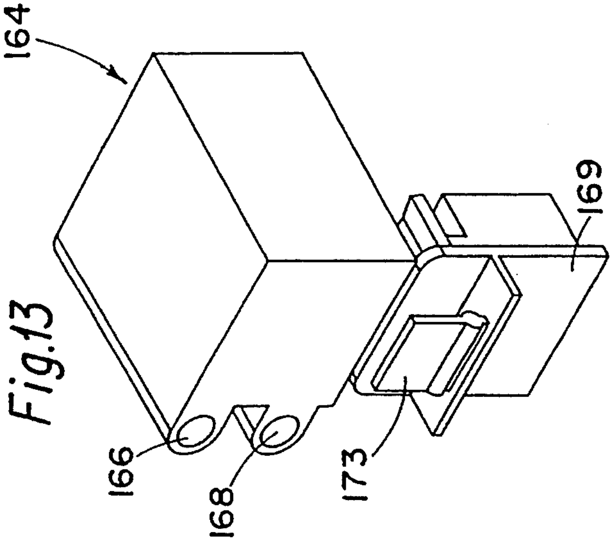
FIGS. 13, 15 and 16 are perspective views of a plurality of print cartridges mounted on a print carriage in a forth printer constructed in accordance with the present invention.
Figure 14:
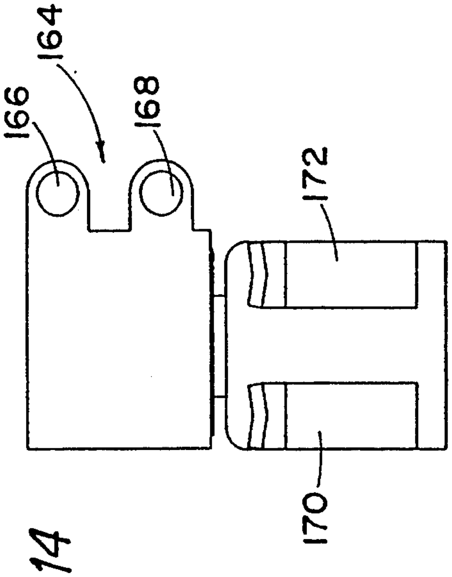
FIG. 14 is a side elevation view of the print cartridges of FIGS. 13, 15 and 16.
Figure 15:
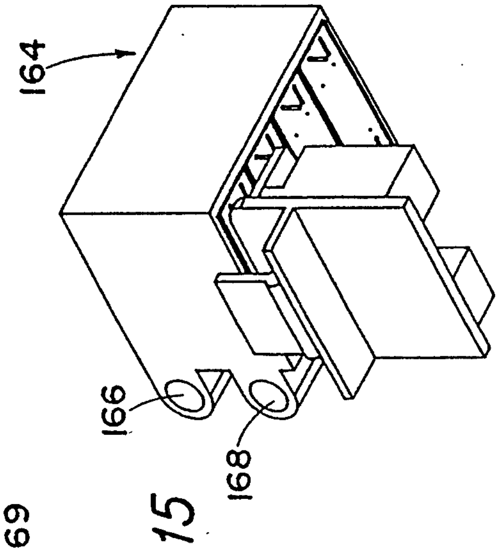
Figure 16:
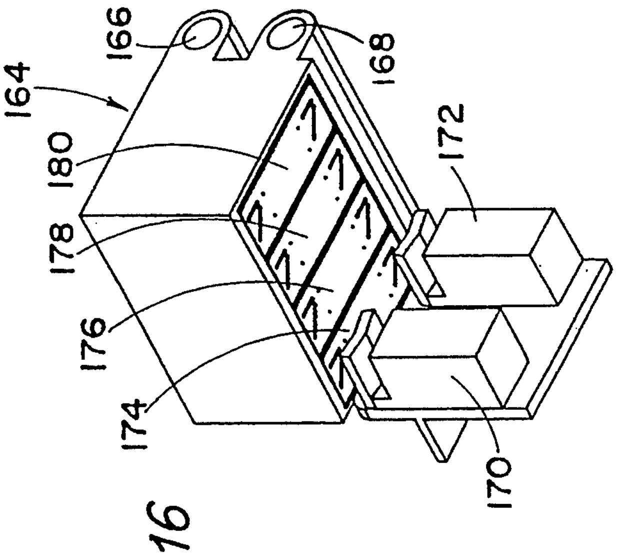

Included on traverser assembly 130 and viewable in FIGS. 10 and 12 are conventional elastomeric wipers, like wiper 162. Each wiper contacts the nozzle plate on the underside of its associated print bar, like wiper 162 contacts the nozzle plate on print bar 136 in FIG. 10. Moving the traverser assembly along the length of the print bar thus clears ink and debris from the nozzle plate in a known manner.

A similar circuit to that shown in FIG. 4 controls dot firing circuitry to printer 102 except that data generated by the position transducer on traverser assembly 130 is also provided to the microprocessor. Given data indicative of where the transducer is and the signals generated by each of the targets, like targets 152, 154 on each print bar, the processor computes the necessary delay or advance for nozzle firing along the Y-axis as well as the necessary lateral shift of image information along the X-axis. The data indicative of transducer location depends in part upon conventional factory calibration of detector position which is then stored in an electrically erasable PROM (not shown) contained in the printer circuitry. For the embodiment of printer 126, target 154 determines misregistration along the X-axis and target 152 enables calculation of misregistration along the Y-axis, i.e., in the direction of paper transport. Targets at opposite ends of the print bar, like targets 152, 154 on one end of the print bar 136 and targets 156, 158 on the other provide data for extrapolating offsets between opposites ends of the print bar and thus providing different delays (and/or advances) for different nozzles along the nozzle plate. Otherwise, operation of the circuit of printer 126 is similar to that of the printer described in FIGS. 1–4.

Turning now to FIGS. 13–16, indicated generally at 164 is a scanning carriage incorporated into another printer embodying the present invention. Scanning carriage 164 is mounted on rods (not shown) which are received through bores 166, 168 formed in the carriage. A plate 169 is fixed on the printer frame relative to the scanning carriage and includes thereon a pair of retro-reflective optical detectors 170, 172 which are constructed and operate as described in connection with printer 126. Scanning carriage 164 includes four ink-jet printhead cartridges mounted thereon. A conventional position transducer (not shown) generates position information indicative of the position of the scanning carriage relative to detectors 170, 172. Nozzle plates 174, 176, 178, 180 of each cartridge may be seen in FIGS. 15 and 16. Also visible in each cartridge are target elements located on either end of each nozzle. A wiper 173 mounted on plate 169 wipes each nozzle plate to remove ink and debris as the carriage passes over plate 169.

Generally speaking, the printer in which scanning carriage 164 is incorporated operates similar to printer 126. Scanning carriage 164 moves across and above a sheet of paper (not shown) received in the printer to permit cartridges 174–180 to fire ink drops thereon under control of an ink dot firing algorithm as in the schematic of FIG. 4. When carriage 164 passes across plate 169, wiper 173 wipes the nozzle plates to remove excess ink and debris. Detectors 170, 172 also transmit signals to the microprocessor which, when combined with position information from the transducer on scanning carriage 164, enables the microprocessor to compute the relative positions of each of nozzle plates 174–180. As in the previous embodiments the actual position is compared with a position for ideal registration of dots printed by one cartridge with each of the others. The difference between the two positions is used by the dot firing algorithm to delay dot firing along the axis of scanning and to shift image information from nozzle to nozzle along the axis of paper transport in order to improve registration of the dots printed by the nozzle plates.

It is to be appreciated that the present invention could be implemented using a system which compares expected travel times of the paper carder with actual travel times. The actual travel times could be derived from the photodetectors implementing the present invention in conjunction with the microprocessor clock. As used herein, the term measuring the actual distance between the first and second positions includes measuring a travel time, from which distance can be determined in conjunction with the velocity at which the system drives, between the first and second positions.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A method for registering printer dots on print media in a printer having separate dot-generating elements which create dots on the print media moving beneath the dot-generating elements, said method comprising the steps of:

approximating an expected distance between a first dot-generating element and a second dot-generating element;

measuring an actual distance between said first dot-generating element and said second dot-generating element by detecting a machine readable mark on a surface moving beneath said first dot-generating element and said second dot-generating element;

calculating a difference between the measured actual distance and the expected distance;

positioning print media on the print media carder;

moving the print media carder so that the print media moves along a print media axis past the first dot-generating element;

printing a first dot on the print media with the first dot-generating element;

moving the print media carrier so that the print media moves the expected distance along the print media axis; and printing a second dot on the print media with the second dot-generating element using the difference to delay or advance printing of the second dot to account for misalignment of the dot-generating elements so that the printed second dot is registered with the printed first dot.

2. The method of claim 1 wherein the step of printing the second dot further comprises the step of using the difference to delay or advance printing of the second dot so as to effectively shift the position of the second dot in a direction along a first axis parallel to the print media axis.

3. The method of claim 1 wherein the step of printing the second dot comprises the steps of:

detecting a lateral displacement of the second dot-generating element; and shifting data representing an image to be printed from a first dot-generator on the second dot-generating element to a second dot-generator, laterally displaced from the first dot-generator, on the second dot-generating element in order to compensate for the lateral displacement of the second dot-generating element.

4. The method of claim 1 wherein the step of printing the second dot comprises the the steps of:

detecting a lateral displacement of the second dot-generating element; and laterally shifting the second dot-generating element along a second axis transverse to the print media axis.

5. The method of claim 1 wherein the step of measuring an actual distance between said first dot-generating element and said second dot-generating element comprises the steps of:

detecting a first time when the machine readable mark passes under the first dot-generating element;

detecting a second time when the machine readable mark passes under the second dot-generating element; and determining the actual distance between the first dot-generating element and the second dot-generating element as a function of the first and second time.

6. The method of claim 5 wherein said surface is formed on the print media carrier.

7. The method of claim 6 wherein the print media carder is a drum and wherein said mark comprises an opening in the drum.

8. The method of claim 7 wherein said drum includes another opening and wherein the step of determining the position of the carrier at which said mark passes beneath said first dot-generating element and said second dot-generating element comprises the step of detecting energy transmitted through both openings.

9. The method of claim 8 wherein the step of detecting energy transmitted through both openings comprises the step of sensing energy striking a detector mounted on each of said dot-generating elements.

10. The method of claim 5 wherein said dot-generating elements each include an opening formed therein and wherein the step of detecting a first time when the machine readable mark passes under the first dot-generating element comprises the step of detecting energy transmitted from said first dot-generating element through the opening in the first dot-generating element.

11. The method of claim 1 wherein the dot-generating elements each have a first end and a second end, the first end and the second end being at opposite lateral ends of the respective dot-generating element, wherein said measuring step includes measuring a first actual distance between the first dot-generating element and the second dot-generating element at the first end thereof and wherein the method further comprises measuring a second actual distance between the first dot-generating element and the second dot-generating element at the second end thereof.

12. The method of claim 11 wherein said calculating step includes calculating a first difference between the first measured actual distance and the expected distance and calculating a second difference between the second measured actual distance and the expected distance wherein the step of printing the second dot comprises:

using the first difference and the second difference to extrapolate the delay or advance along the second dot-generating element.

* * * * *